(12) United States Patent
Brondijk

(10) Patent No.: US 7,546,495 B2
(45) Date of Patent: Jun. 9, 2009

(54) METHOD AND DEVICE FOR MANAGING DEFECTIVE STORAGE UNITS ON A RECORD CARRIER

(75) Inventor: Robert Albertus Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 802 days.

(21) Appl. No.: 10/531,019

(22) PCT Filed: Sep. 17, 2003

(86) PCT No.: PCT/IB03/04172

§ 371 (c)(1), (2), (4) Date: Apr. 12, 2005

(87) PCT Pub. No.: WO2004/036581

PCT Pub. Date: Apr. 29, 2004

(65) Prior Publication Data

US 2006/0015766 A1    Jan. 19, 2006

(30) Foreign Application Priority Data

Oct. 16, 2002    (EP) .................................. 02079279

(51) Int. Cl.
*G11C 29/00* (2006.01)
*G06F 11/00* (2006.01)
(52) U.S. Cl. ........................... 714/710; 714/8; 714/723; 714/766
(58) Field of Classification Search ....................... None
See application file for complete search history.

(56) References Cited

U.S. PATENT DOCUMENTS

| | | | |
|---|---|---|---|
| 5,918,001 A * | 6/1999 | Ueno et al. ..................... | 714/8 |
| 6,223,303 B1 | 4/2001 | Billings | |
| 6,545,833 B1 * | 4/2003 | Ee et al. ......................... | 360/53 |
| 6,725,395 B2 * | 4/2004 | Ono et al. ....................... | 714/8 |

\* cited by examiner

*Primary Examiner*—Christine T Tu

(57) ABSTRACT

The present invention relates to a method and a corresponding device for managing defective storage units on a record carrier, in particular on a rewritable optical record carrier. To avoid synchronization errors of a drive when accessing storage units located before or after a defective storage unit, it is proposed according to the present invention not only to map the actual defective storage unit (U1) but also one or more storage units (U2-U5) located before and/or after the defective storage unit (U1) as defective.

14 Claims, 2 Drawing Sheets

METHOD AND DEVICE FOR MANAGING DEFECTIVE STORAGE UNITS ON A RECORD CARRIER

Figure 1:
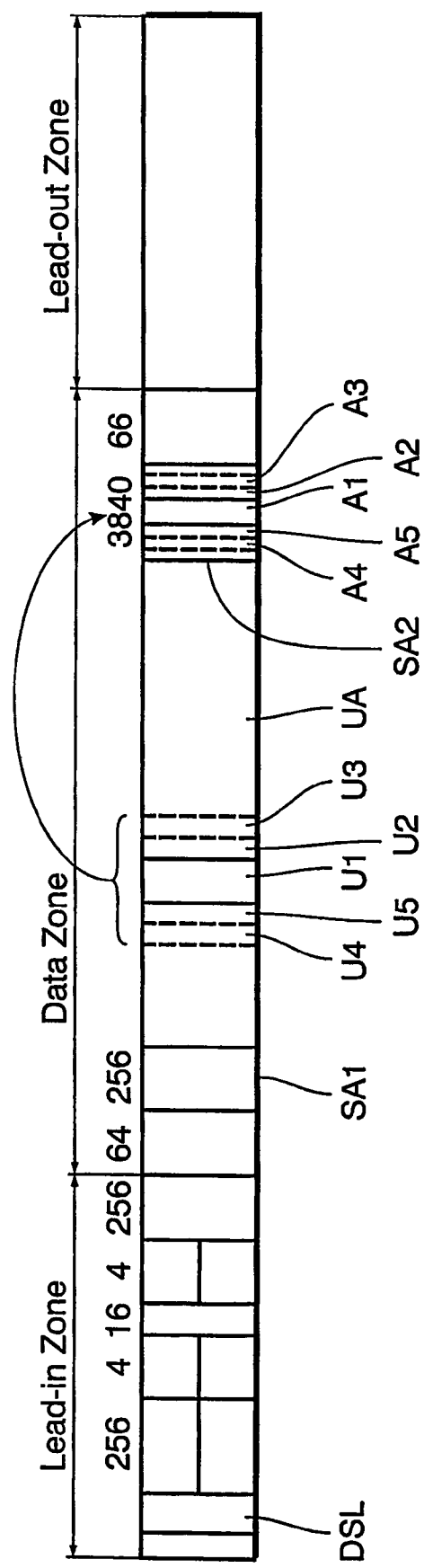

The present invention relates to a method of managing defective storage units on a record carrier, in particular on a rewritable optical record carrier. Further, the present invention relates to a corresponding device, to a recording apparatus, to a record carrier, and to a computer program for implementing said method.

An erasable optical disc and optical information recording and reproducing apparatus having means for managing defective sectors are disclosed in EP 0 272 029 A2. The optical disc comprises a plurality of track blocks each comprising data sectors for recording data thereon, alternate sectors for substituting defective ones of the data sectors, and at least one mapping sector for recording mapping data representing the address correspondence between the defective sectors and the alternate sectors substituting the defective sectors. Mapping data is recorded on the mapping sector in the same block and, at the time of data reproduction or data re-writing, the address information of the alternate sector is detected from the mapping sector of the block to which the alternate sector belongs, so that the data can be reproduced from or re-written on the alternate sector at a high speed.

It has been found that, in particular on rewritable optical record carriers, such as a DVD+RW disc, a defect may be very severe and may cause servo errors causing the drive to map storage units, i.e. sectors (access blocks) or storage blocks, such as ECC blocks, which are still "iced", i.e. on which no data have been recorded yet. In this situation the molecules of a recordable disc's surface all have the same state, namely the "crystalline" state which is called "iced". Since according to the known methods only defective storage units are mapped in the mapping storage unit or a defective storage unit list, it happens that in case of a severe error a drive, in particular a DVD-ROM drive, after tracking over the error of the defective storage unit, cannot regain its synchronization fast enough to read the subsequent storage units following the defective storage units.

It is thus an object of the present invention to provide a method and a corresponding device which allow a drive to get into synchronization after tracking over a defective storage unit. Furthermore, a corresponding record carrier and a computer program for implementing said method shall be provided.

This object is achieved according to the present invention by a method as claimed in claim 1 comprising the steps of:
  storing first user data, which are or should be in storage in a first user storage unit denoted defective storage unit, in a first alternate storage unit,
  storing second user data, which are or should be in storage in second user storage units located before and/or behind said first user storage unit denoted defective storage unit, in second alternate storage units, and
  storing address entries of said first and second alternate storage units in a defective storage unit list to be used for accessing said first and second user data instead of address entries of said first and second user storage units.

This object is further achieved by a device as claimed in claim 6 comprising:
  data storage means for storing first user data, which are or should be in storage in a first user storage unit denoted defective storage unit, in a first alternate storage unit and for storing second user data, which are or should be in storage in second user storage units located before and/or behind said first user storage unit denoted defective storage unit, in second alternate storage units, and
  address storage means for storing address entries of said first and second alternate storage units in a defective storage unit list to be used for accessing said first and second user data instead of address entries of said first and second user storage units.

A recording apparatus for recording data on a record carrier comprising such a device for managing defective storage units is claimed in claim 7. A corresponding record carrier, in particular a recordable optical record carrier, is defined in claim 8. A computer program for implementing the method according to the invention is defined in claim 9. Preferred embodiments of the invention are defined in the dependent claims.

The present invention is based on the idea to map not only defective storage units as defective but also one or more storage units following or located before a defective storage unit, i.e. a first user storage unit, or a plurality of subsequent defective storage units, so as to ensure that a drive need not read the contents from these storage units, called second user storage units, but from the corresponding second alternate storage units mapped in the defective storage unit list. To read data following a defect the drive must "turn on" its laser several storage units before the user storage unit it wants to read. If the laser is turned on when the drive passes over a severe defect, its phase locked loop (PLL) will not lock, causing a synchronization error before the data it needs to read.

According to particular embodiments, e.g. for DVD, a decoder uses the clock generated when reading block N for reading block N−1, which is still in its internal buffer. It is therefore proposed to map also one or more storage units located before storage units which have been detected as defective.

In a preferred embodiment, a particular defect area is provided, for instance in the data zone arranged between a lead-in zone and a lead-out zone of an optical record carrier, where said first and second alternate storage units are located. This defect area is a particular reserved area for storing only user data which were originally stored or should have been stored in user storage units, in particular of the data zone. The defective storage unit list is usually stored in a different section of the defect area than the data itself.

While according to one embodiment single sectors are mapped, according to another embodiment not only single sectors, but one or more whole ECC blocks located before and/or behind a defective storage unit, e.g. a defective ECC block, are stored in second alternate storage units, in particular in second alternate ECC blocks. Furthermore, it is preferred to store the data in the same sequence of storage units in alternate storage units as that in which they were or should have been stored in user storage units.

Figure 2:
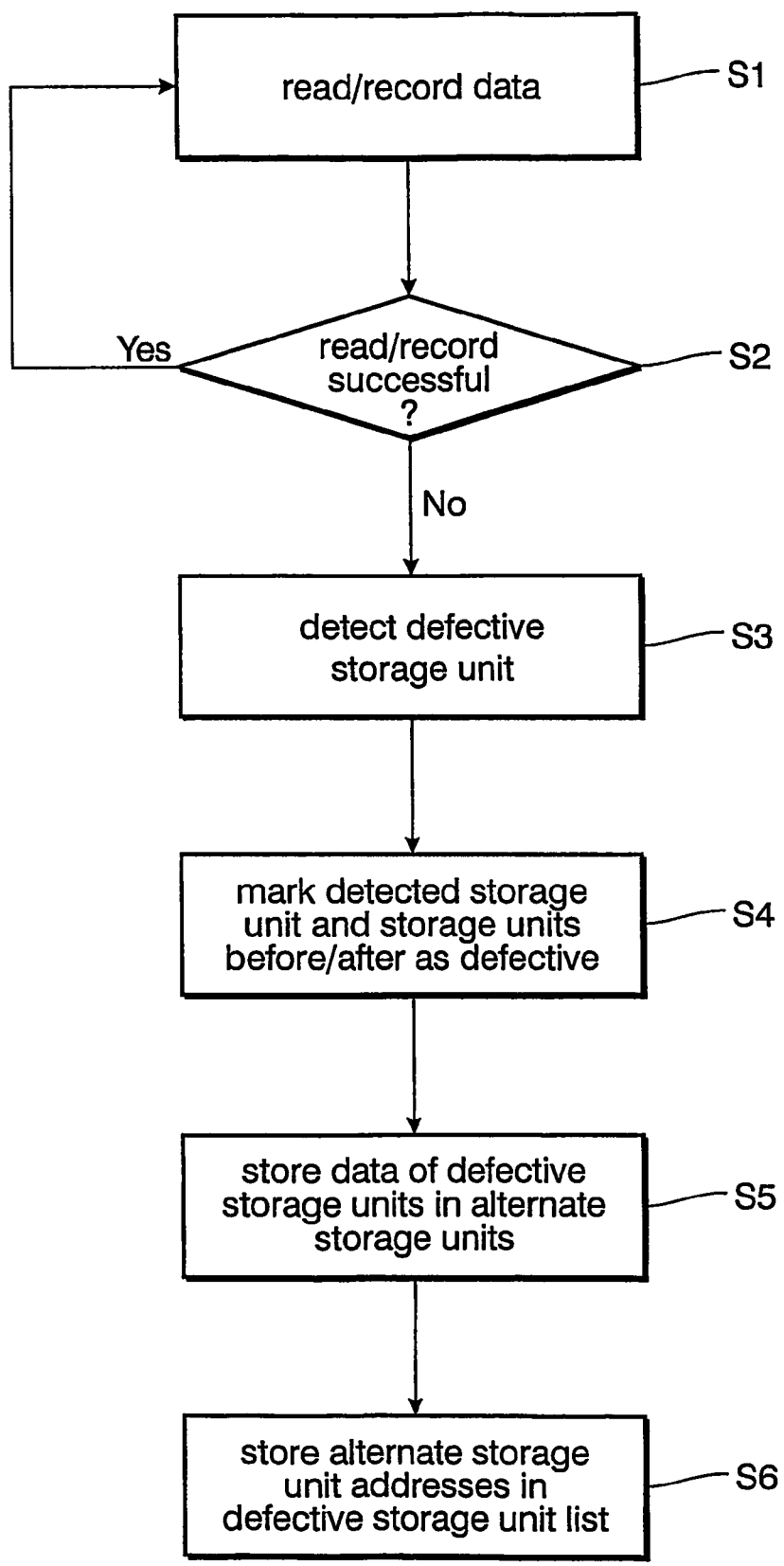

The present invention will now be explained in more detail with reference to the drawings, in which FIG. 1 shows the layout of the different zones of an optical record carrier, and FIG. 2 is a flowchart illustrating the method according to the present invention.

FIG. 1 shows the different zones of the memory on an optical record carrier, in particular on a DVD+RW. Generally an optical record carrier has a lead-in zone, in particular for storing administrative data, a data zone for storing user data, and a lead-out zone for storing administrative data. In the lead-in zone there is a defective storage unit list DSL storing paired physical addresses. The first address of the pair is an address in the user area UA of the data zone and the second one is an address in the defect area SA of the data zone. Paired addresses in the defect storage unit list DSL imply that a storage unit, i.e. a storage block (ECC block), in the defect area SA is to be accessed instead of its paired storage unit, i.e. a storage block (ECC block), in the user area UA. In effect, the storage unit in the user area UA has been "mapped" into the defect area SA. Mapping primarily occurs when a defective storage unit in the user area UA is encountered. A storage unit is considered defective after an unsuccessful read action has taken place.

The present invention will now be illustrated with reference to FIG. 2, which is a flowchart of said method. Step S1 represents a read or a recording action for accessing a particular user storage unit to read user data stored therein or to record user data therein. If said action is successful (S2), the next read or recording action (S1) can be performed. If, however, the read or recording action is not successful (S2), the user storage unit that should have been accessed is considered to be a defective storage unit (S3). In the next step S4 the user storage unit U1 detected as defective storage unit is marked accordingly. However, to avoid synchronization errors also one or more user storage units before (U4, U5) and one or more user storage units after (U2, U3) the actual defective storage unit U1 are also marked as defective storage units so as to avoid that the drive tries to access these storage units which may cause synchronization errors.

The data already stored in the user storage units U1-U5 marked as defective storage units or user data which should have been stored therein are thereafter stored in the alternate storage units A1-A5 located in the defect area SA2 to which the defective user storage units U1-U5 are mapped in this example (S5).

The addresses of the alternate storage units A1-A5 are then entered into the defective storage unit list DSL, thus indicating that not the original user storage units U1-U5 are to be accessed by a drive but the alternate storage units A1-A5 (step S6).

Whereas conventionally only the defective storage unit itself (U1) would be mapped, according to the present invention also non-defective storage units are mapped into the defect area to provide a "run-in" and a "run-out" zone for a drive accessing the record carrier, so that no synchronization errors will arise and user data stored in storage units located immediately before or after a defective storage unit can be read correctly.

A "run-in" zone may be considered as a zone of dummy data which an EFM decoder can use to come into synchronization. This is required since an EFM code contains its own clock information. This implies that, in order to read and decode an EFM code, a clock must be running and be in synchronization with the data. This means that the very first sequence of EFM data can never be read since it takes time to get a clock into synchronization. Furthermore, a "run-out" zone ensures proper handling of data when the EFM decoding stops. Otherwise data which have already been read may not be handled correctly because it has no data following it, the clock for handling the data being derived from the EFM.

According to the present invention, one or more correct user storage units, in particular sector or more preferably storage blocks, located before one single or a plurality of subsequent defective storage units will also be marked as defective storage units and mapped onto a defect area The number of correct user storage units before or after a defective storage units that are to be mapped depends on the size of the defect. Not only single sectors may be mapped, but also one or more complete ECC blocks each containing a number of sectors, for instance 16 sectors.

The invention claimed is:

1. A method of managing defective storage units on a record carrier, of the method comprising acts of:
    storing first user data, determined for storage in a first user storage unit denoted as a defective storage unit, in a first alternate storage unit,
    storing second user data, determined for storage in a second user storage unit that is not a defective storage unit in a second alternate storage unit, and
    storing address entries of said first and second alternate storage units in a defective storage unit list to be used for accessing said first and second user data instead of address entries of said first and second user storage.

2. The method as claimed in claim 1, wherein said first and second alternate storage units are located in a defect management area.

3. The method as claimed in claim 1, wherein said first user storage unit is at least a portion of an ECC block.

4. The method as claimed in claim 1, wherein the second user data comprises an ECC block.

5. The method as claimed in claim 1, wherein said second alternate storage unit is located before or behind said first alternate storage unit.

6. The method as claimed in claim 1, wherein the record carrier is a rewritable optical record carrier.

7. The method as claimed in claim 1, wherein said second user storage unit is at least a portion of an ECC block.

8. The method as claimed in claim 1, wherein the act of storing said first and second user data results in a same sequence of storage units in the first and second alternate storage units as would have occurred when the first and second user data been stored in the first and second storage units.

9. The method as claimed in claim 1, comprising an act of marking the second user storage unit that is not a defective storage unit as a defective storage unit.

10. The method as claimed in claim 1, wherein said second user storage unit is located before or behind said first storage unit.

11. A device for managing defective storage units on a record carrier, the device comprising:
    data storage means for storing first user data, determined for storage in a first user storage unit denoted as a defective storage unit, in a first alternate storage unit and for storing second user data, determined for storage in a second user storage unit that is not a defective storage unit, in a second alternate storage unit, and
    address storage means for storing address entries of said first and second alternate storage units in a defective storage unit list to be used for accessing said first and second user data instead of address entries of said first and second user storage units.

12. Recording apparatus for recording data on a record carrier, the apparatus comprising:
    data storage means for storing first user data, determined for storage in a first user storage unit denoted as a defective storage unit, in a first alternate storage unit and for storing second user data, determined for storage in a second user storage unit that is not a defective storage unit, in a second alternate storage unit, and
    address storage means for storing address entries of said first and second alternate storage units in a defective storage unit list to be used for accessing said first and second user data instead of address entries of said first and second user storage units.

13. A record carrier comprising:
a first alternate storage unit for storing first user data determined for storage in a first user storage unit that is denoted a defective storage unit,
second alternate storage unit for storing second user data determined for storage in a second user storage unit that is not a defective storage unit, and
a defective storage unit list for storing address entries of said first and second alternate storage units, wherein said defective storage unit list is used for accessing said first and second user data instead of address entries of said first and second user storage units.

14. Computer program stored on a computer readable device, the computer program comprising computer program means for causing a computer to perform acts of:

storing first user data, determined for storage in a first user storage unit denoted as a defective storage unit, in a first alternate storage unit, storing second user data, determined for storage in a second user storage unit that is not a defective storage unit, in a second alternate storage unit, and storing address entries of said first and second alternate storage units in a defective storage unit list to be used for accessing said first and second user data instead of address entries of said first and second user storage units.

* * * * *